(12) United States Patent
Sivavakeesar et al.

(10) Patent No.: US 11,412,565 B2
(45) Date of Patent: Aug. 9, 2022

(54) COMMUNICATION SYSTEM

(71) Applicant: NEC CORPORATION, Tokyo (JP)

(72) Inventors: Sivapathalingham Sivavakeesar, Milton Keynes (GB); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 395 days.

(21) Appl. No.: 16/086,203

(22) PCT Filed: Mar. 23, 2017

(86) PCT No.: PCT/JP2017/011713
§ 371 (c)(1),
(2) Date: Sep. 18, 2018

(87) PCT Pub. No.: WO2017/170121
PCT Pub. Date: Oct. 5, 2017

(65) Prior Publication Data
US 2020/0323010 A1    Oct. 8, 2020

(30) Foreign Application Priority Data

Mar. 31, 2016 (GB) ...................... 1605466

(51) Int. Cl.
*H04W 76/19* (2018.01)
*H04W 4/70* (2018.01)
(Continued)

(52) U.S. Cl.
CPC ............. *H04W 76/19* (2018.02); *H04W 4/70* (2018.02); *H04W 8/08* (2013.01);
(Continued)

(58) Field of Classification Search
CPC ....... H04W 76/19; H04W 4/70; H04W 76/11; H04W 76/27; H04W 8/08;
(Continued)

(56) References Cited

U.S. PATENT DOCUMENTS

2012/0236709 A1* 9/2012 Ramachandran ..... H04W 76/18
370/221
2013/0260811 A1 10/2013 Rayavarapu
(Continued)

FOREIGN PATENT DOCUMENTS

EP         2 557 889 A1    2/2013
WO    WO-2016207904 A1 * 12/2016 ........ H04W 36/0033

OTHER PUBLICATIONS

3GPP TSG- RAN WG2 Meeting #93 R2-161166 St. Julian's, Malta, Feb. 15-19, 2016; "Summary of email discussion: [NBAH #04][NBIOT/Resume] RRC Functions for suspend—resume"; Huawei (Year: 2016).*

(Continued)

*Primary Examiner* — Benjamin H Elliott, IV
(74) *Attorney, Agent, or Firm* — Sughrue Mion, PLLC

(57) ABSTRACT

A system is disclosed in which a base station receives, from a core network node (e.g. a mobility management entity), a resume identifier associated with a communication device located within a cell of the base station. The base station retrieves, based on the received resume identifier, a user equipment (UE) context associated with the communication device, for use in resumption of a suspended communication connection (e.g. a radio resource control connection) by the communication device.

7 Claims, 8 Drawing Sheets

(51) Int. Cl.
*H04W 76/11* (2018.01)
*H04W 76/27* (2018.01)
*H04W 8/08* (2009.01)
*H04W 36/00* (2009.01)

(52) U.S. Cl.
CPC ... *H04W 36/0033* (2013.01); *H04W 36/0055* (2013.01); *H04W 76/11* (2018.02); *H04W 76/27* (2018.02)

(58) Field of Classification Search
CPC ......... H04W 36/0033; H04W 36/0055; H04W 60/00; H04W 8/20; H04W 92/20
See application file for complete search history.

(56) References Cited

U.S. PATENT DOCUMENTS

| | | | |
|---|---|---|---|
| 2016/0195859 A1* | 7/2016 | Britt | H04L 12/2816 700/275 |
| 2016/0198536 A1* | 7/2016 | Britt | H02J 7/00 315/149 |
| 2017/0202003 A1* | 7/2017 | Johansson | H04W 72/10 |
| 2017/0202050 A1* | 7/2017 | Deng | H04W 72/04 |
| 2017/0202051 A1* | 7/2017 | Hwang | H04W 76/19 |
| 2018/0020382 A1* | 1/2018 | Kim | H04W 8/22 |
| 2018/0110092 A1* | 4/2018 | Liu | H04L 1/00 |
| 2018/0192332 A1* | 7/2018 | Joshi | H04W 36/0033 |
| 2019/0021023 A1* | 1/2019 | Byun | H04W 28/02 |
| 2019/0021128 A1* | 1/2019 | Sivavakeesar | H04W 4/70 |
| 2019/0029066 A1* | 1/2019 | Xu | H04W 76/19 |
| 2019/0036562 A1* | 1/2019 | Thakkar | H04W 8/183 |
| 2019/0045482 A1* | 2/2019 | Lee | H04W 76/27 |
| 2019/0045572 A1* | 2/2019 | Kim | H04W 76/30 |
| 2019/0052435 A1* | 2/2019 | Martin | H04W 72/0413 |
| 2019/0069160 A1* | 2/2019 | Byun | H04W 76/30 |
| 2020/0323010 A1* | 10/2020 | Sivavakeesar | H04W 76/11 |

OTHER PUBLICATIONS

3GPP TSG-RAN2 WG2 Meeting #93 R2-161619 St. Julian's, Malta, Feb. 15 - 19, 2016; "Re-use of RRC connection re-establishment procedure for RRC Resume signalling"; Blackberry (Year: 2016).*
3GPP TSG-RAN WG2 #93 R2-161653 Feb. 15-19, 2016 St. Julian's, Malta; "RRC Connection Resume at different eNB"; NTT DoCoMo (Year: 2016).*
3GPP TSG-RAN WG2 #93 Tdoc R2-161743 Malta, Feb. 15-19, 2016; "Resume ID"; Ericsson (Year: 2016).*
3GPP Tsg RAN3 Meeting #91 R3-160192 Malta, Feb. 15-19, 2016; "Resume ID and UE context retrieval"; CATT (Year: 2016).*
3GPP TSG RAN WG3#91 R3-160428 St Julian's, Malta, Feb. 15-19, 2016; "Stage-3 CR: S1-based Context-fetch", change request; NEC (Year: 2016).*
3GPP TSG-RAN WG3 Meeting #91 R3-160460 St.Julian's, Malta, Feb. 15 -19, 2016; "Introduction of Initial UE Context Indication procedure"; Huawei et al. (Year: 2016).*
"3rd Generation Partnership Project; Technical Specification Group Services and System Aspects; Study on architecture enhancements for Cellular Internet of Things (Release 13)", 3GPP TR 23.720 V13.0.0, Mar. 24, 2016, pp. 1-94.
Ericsson et al.: "Introduction of the inter-eNB Context Resume Function", 3GPP Draft; R3-160462, Feb. 18, 2016, pp. 1-4.
Nokia Networks et al.: "NB-IoT—Further details on RRC suspend and resume", 3GPP Draft; R2-161522, Feb. 5, 2016, pp. 1-4.
NEC: "Stage-2 CR: X2-based Context-fetch", 3GPP Draft;R3-160270_X2_STAGE2_CR, Feb. 6, 2016, pp. 1-13.
NEC: "Stage-2 CR: S1-based Context-fetch", 3GPP Draft;R3-160427_S1_STAGE2_CR_V02, Feb. 15, 2016, pp. 1-4.
"$3^{rd}$ Generation Partnership Project; Technical Specification Group Services and System Aspects; Architecture enhancements for Cellular Internet of Things (Release 13)", 3GPP TR 23.720 V1.2.0, Nov. 2011, pp. 1-96.
"$3^{RD}$ Generation Partnership Project; Technical Specification Group Services and System Aspects; Service requirements for Machine-Type Communications (MTC); Stage 1 (Release 13)", 3GPP TS 22.368 standard V13.1.0, Dec. 2014.
"User plane based solution with AS information stored in RAN", Ericsson, 3GPP TSG-RAN WG3 Meeting #90, R3-152686, Nov. 2015, pp. 1-5.
"Introduction of the inter-eNB Context Resume Function", Ericsson, NEC, Nokia Networks, Alcatel-Lucent, 3GPP TSG-RAN WG3 # 91, R3-160462, Feb. 15-19, 2016, pp. 1-4.
International Search Report for PCT/JP2017/011713 dated Jun. 21, 2017 [PCT/ISA/210].
Great Britain Search Report for GB1605466.0 dated Oct. 31, 2016.
Ericsson,"Introduction of the inter-eNB UE Context Resume function", 3GPP TSG-RAN WG3 #91, Feb. 15-19, 2016, R3-160550, 101 pages.
Communication dated Sep. 3, 2019, from the Japanese Patent Office in counterpart application No. 2018-549589.

* cited by examiner

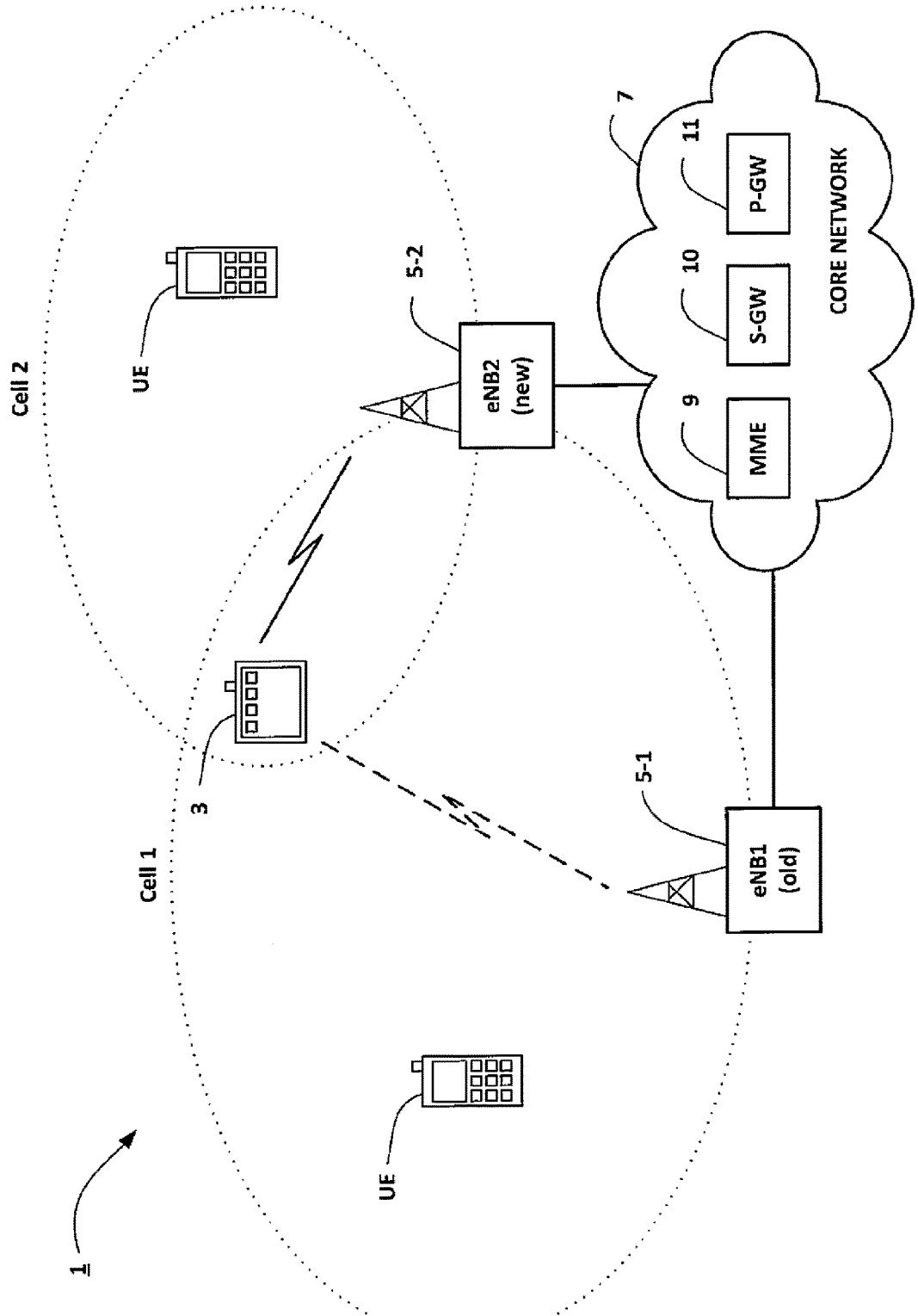
[Fig. 1]

[Fig. 2]
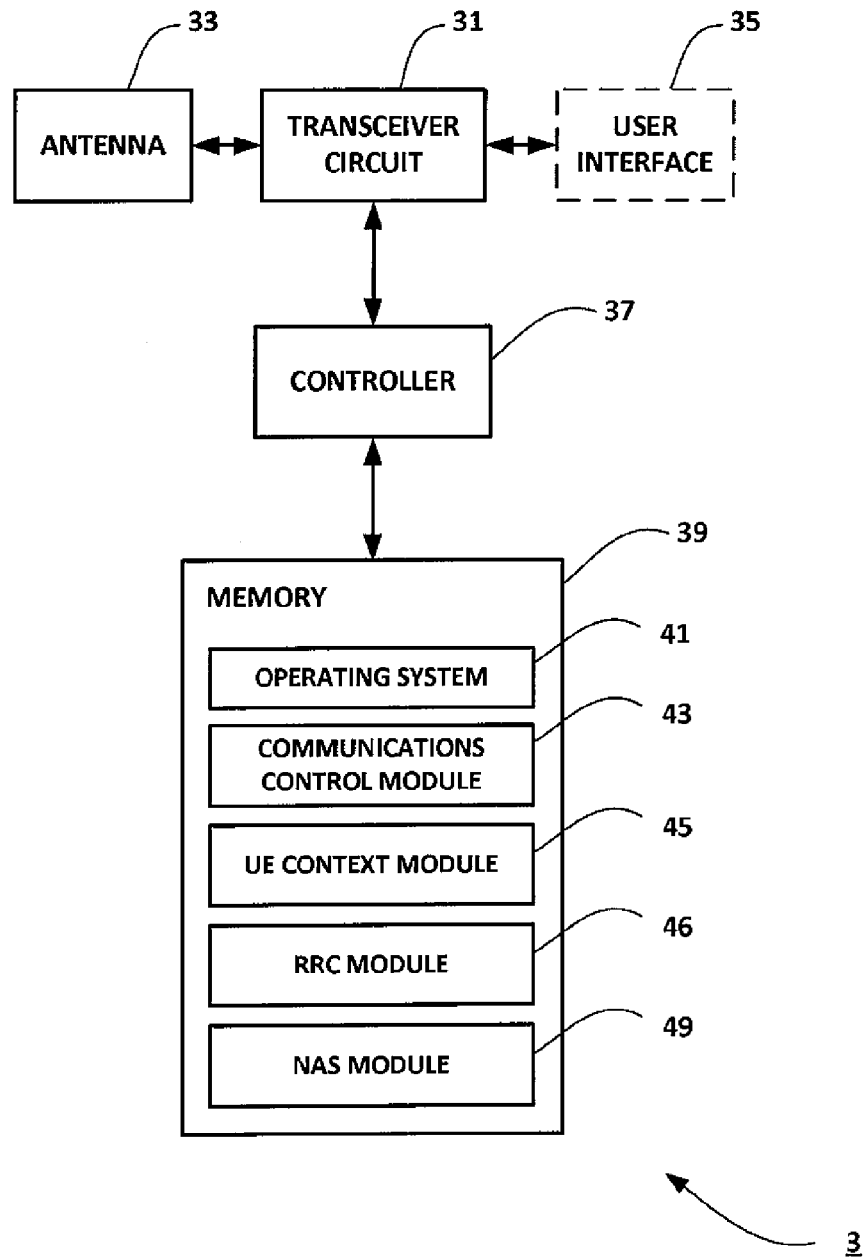

[Fig. 3]
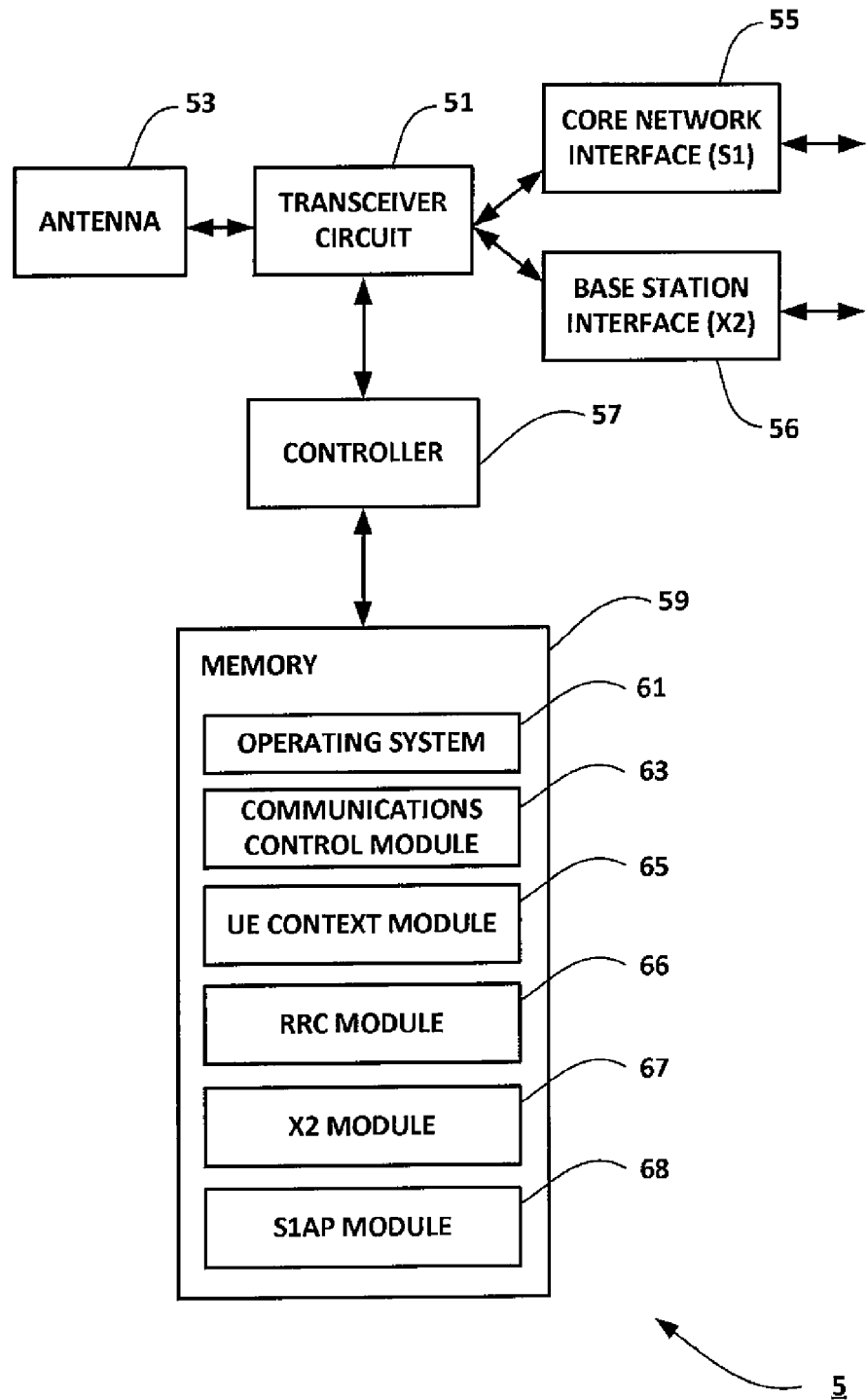

[Fig. 4]
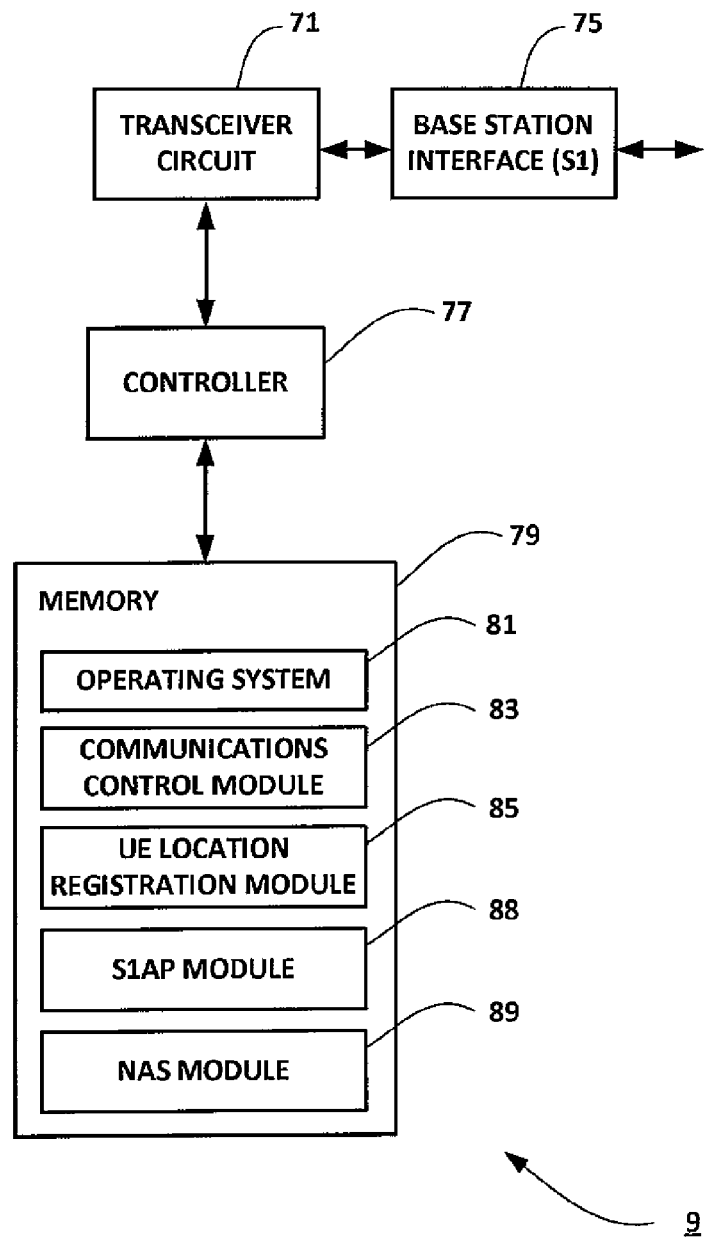

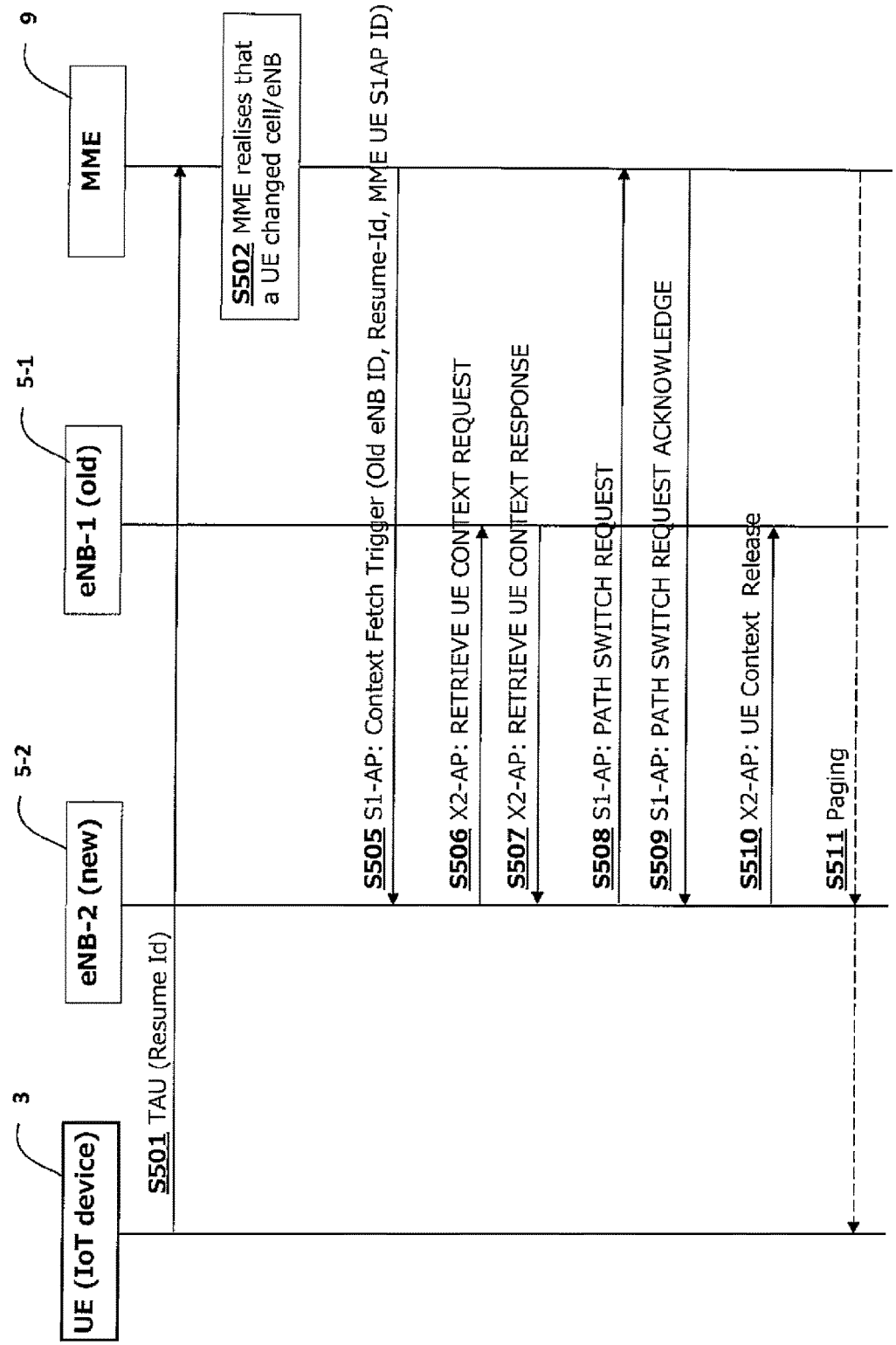

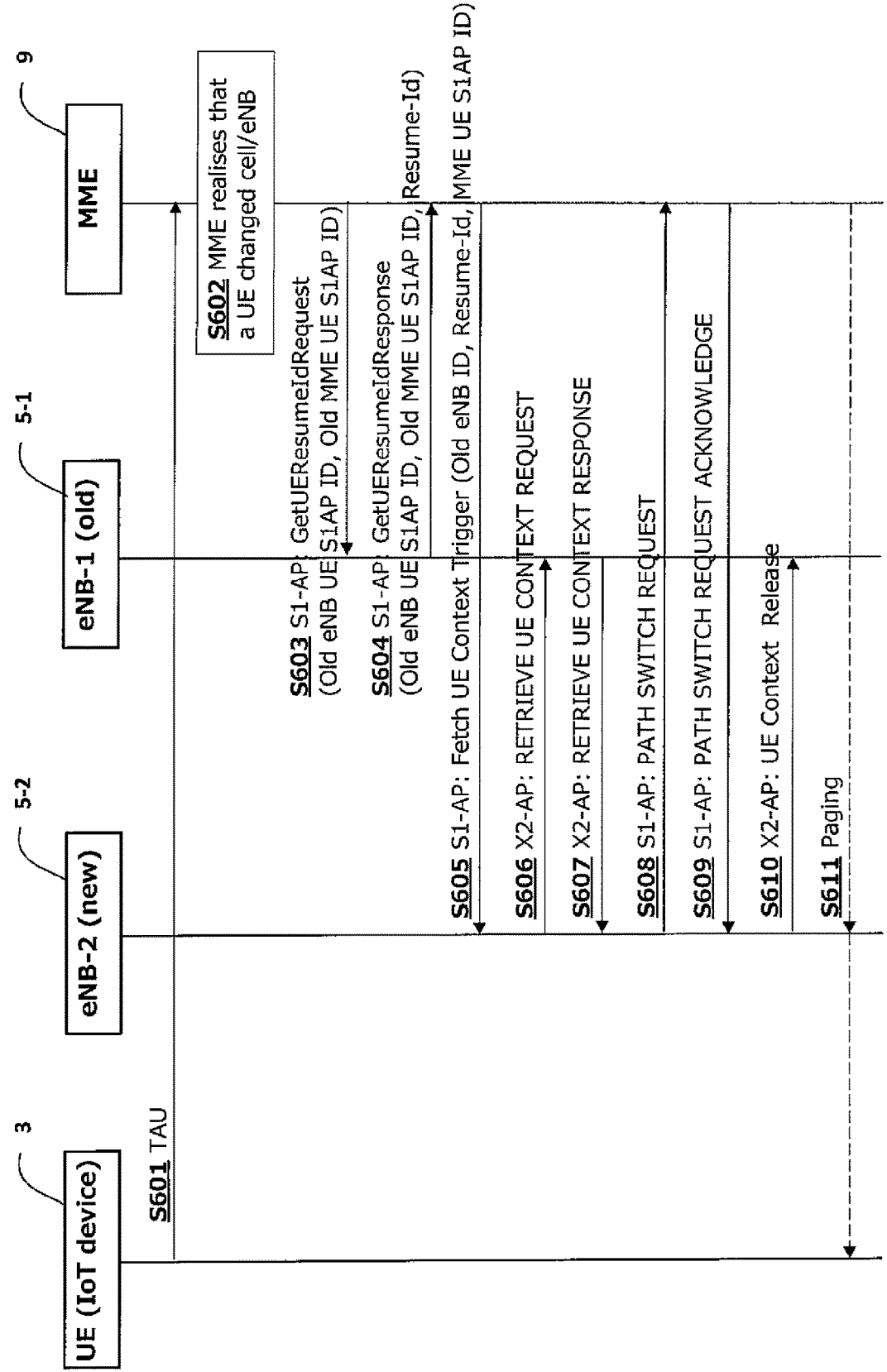
[Fig. 6]

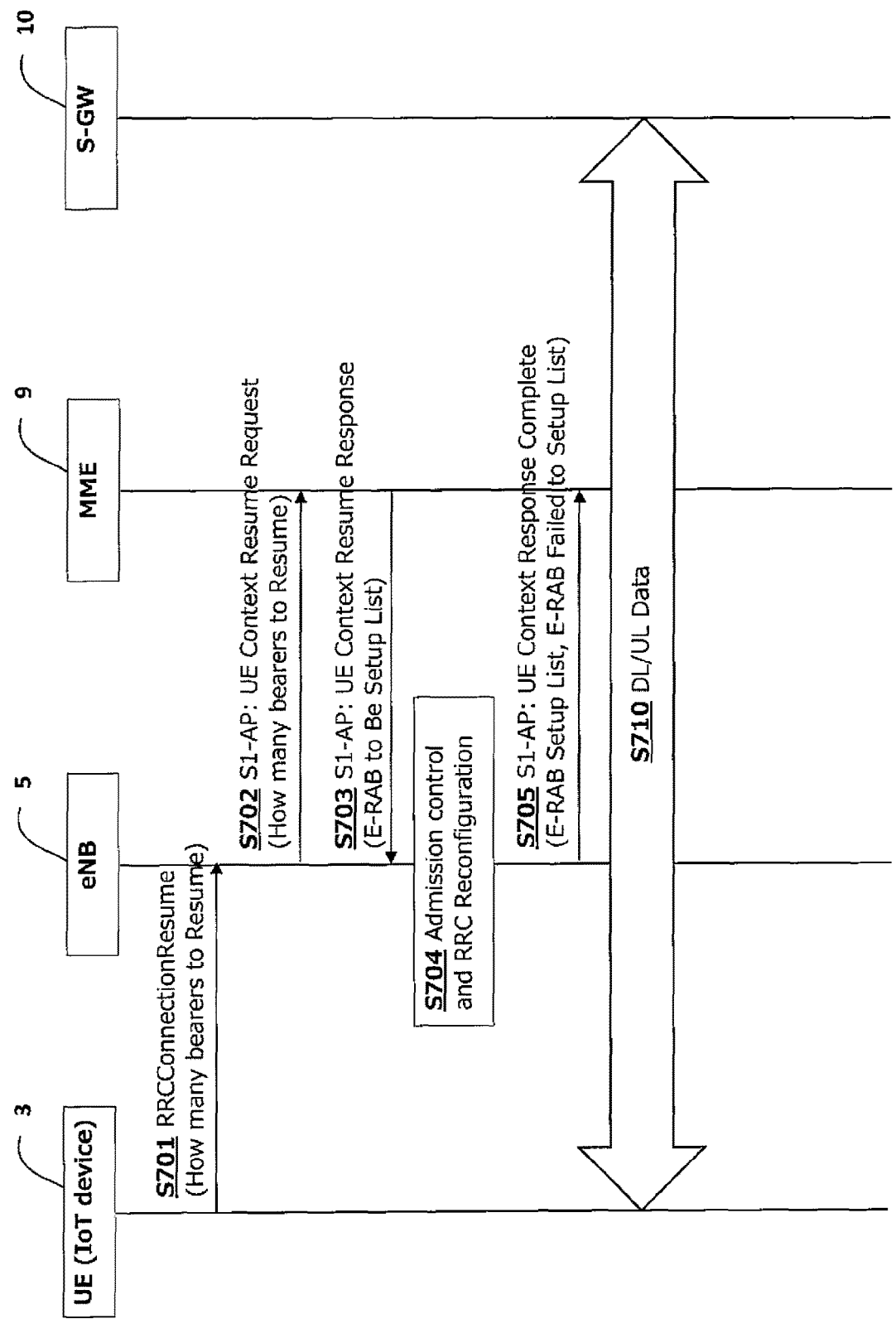

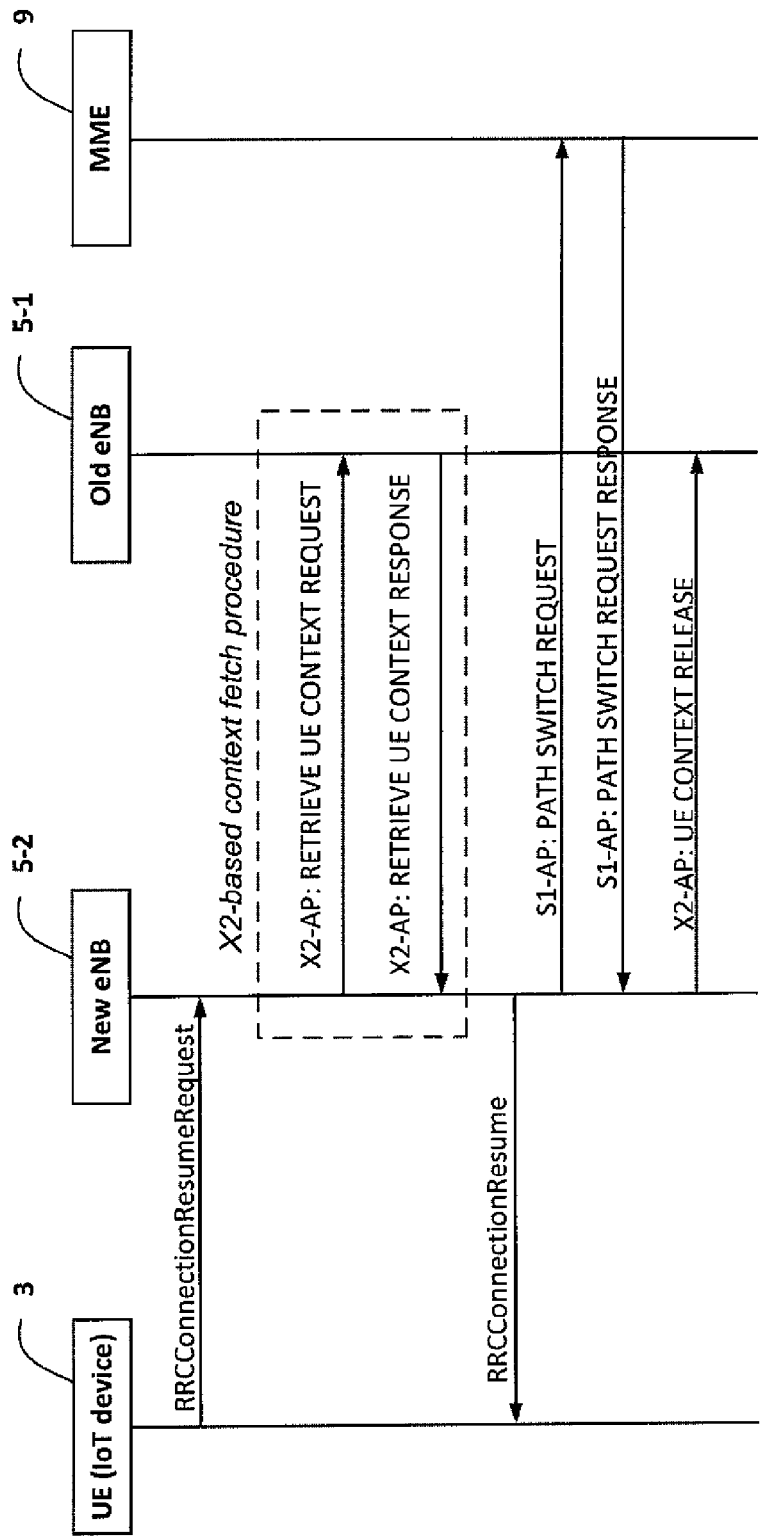
[Fig. 8]

COMMUNICATION SYSTEM

CROSS REFERENCE TO RELATED APPLICATIONS

This application is a National Stage of International Application No. PCT/JP2017/011713 filed Mar. 23, 2017, claiming priority based on United Kingdom Patent Application No. 1605466.0 filed Mar. 31, 2016, the disclosure of which is incorporated herein in its entirety by reference.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to data transmissions by 'Internet of Things' devices and/or similar (narrowband) communication devices.

BACKGROUND ART

The latest developments of the 3GPP standards are referred to as the Long Term Evolution (LTE) of Evolved Packet Core (EPC) network and Evolved UMTS Terrestrial Radio Access Network (E-UTRAN). Under the 3GPP standards, a NodeB (or an eNB in LTE) is the base station via which communication devices connect to a core network and communicate to other communication devices or remote servers. For simplicity, the present application will use the term base station to refer to any such base stations.

Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user. However, 3GPP standards also make it possible to connect so-called 'Internet of Things' (IoT) devices (e.g. Narrow-Band IoT (NB-IoT) devices) to the network, which typically comprise automated equipment, such as various measuring equipment, telemetry equipment, monitoring systems, tracking and tracing devices, in-vehicle safety systems, vehicle maintenance systems, road sensors, digital billboards, point of sale (POS) terminals, remote control systems and the like. IoT devices can be implemented as a part of a (generally) stationary apparatus such as vending machines, roadside sensors, POS terminals, although some IoT devices can be embedded in non-stationary apparatus (e.g. vehicles) or attached to animals or persons to be monitored/tracked. It will be appreciated that IoT devices are sometimes also referred to as Machine-Type Communication (MTC) communication devices or Machine-to-Machine (M2M) communication devices. However, IoT devices form a special subset of MTC devices because of their strict narrow-band requirement and/or energy conservation needs (e.g. battery may not be replaced for several years).

Effectively, the Internet of Things is a network of devices (or "things") equipped with appropriate electronics, software, sensors, network connectivity, and/or the like, which enables these devices to collect and exchange data with each other and with other communication devices. For simplicity, the present application refers to IoT devices in the description but it will be appreciated that the technology described can be implemented on any communication devices (mobile and/or generally stationary) that can connect to a communications network for sending/receiving data, regardless of whether such communication devices are controlled by human input or software instructions stored in memory.

IoT devices connect to the network to send to or receive data from a remote 'machine' (e.g. a server) or user. IoT devices use communication protocols and standards that are optimised for mobile telephones or similar user equipment. However, IoT devices, once deployed, typically operate without requiring human supervision or interaction, and follow software instructions stored in an internal memory. IoT devices might also remain stationary and/or inactive for a long period of time. The specific network requirements to support IoT devices have been dealt with in the 3GPP technical report (TR) 23.720 V1.2.0, the contents of which are incorporated herein by reference. Further network requirements relating to IoT devices (and other MTC devices in general) are disclosed in 3GPP TS 22.368 standard V13.1.0. It will be appreciated that (although most IoT devices do not move and/or move infrequently) due to shadowing, fading, and/or other wireless impairments, IoT devices may switch their cell/eNB point of attachment from one cell/base station to another.

IoT devices are generally designed to be able to operate without human supervision for as long as possible. For example, IoT devices can be programmed to autonomously set up a connection to report an event and then to go back to a low-power mode of operation, such as a sleep mode, stand-by mode, and the like.

Ensuring battery longevity of devices is one of the utmost design considerations of NB-IoT work. Battery longevity is made possible by keeping certain tasks such as data storing and retrieval to a minimum while making IoT devices simpler. As a result, quick data transmission and associated power savings can be achieved.

3GPP considered a number of solutions for enabling lightweight data transmission for NB-IoT devices. One of the solutions shortlisted by 3GPP (referred to as 'Solution 18') facilitates lightweight data transmission on the user plane by cutting short the number of message cycles required. Further details of Solution 18 may be found in 3GPP R3-152686 (titled "User plane based solution with AS information stored in RAN") and TR 23.720 ("Architecture enhancements for Cellular Internet of Things"), the entire contents of which documents are incorporated herein by reference.

One goal of Solution 18 is to reduce the signalling overhead associated with IoT transmission and to reduce a related processing load in the network. In order to achieve this goal, a new behaviour is expected from some of the involved network nodes (e.g. the UE/IoT device, base station (eNB), mobility management entity (MME), and the serving gateway). Specifically, Solution 18 requires the following:

caching of access stratum (AS) level information necessary to operate a radio resource control (RRC) connection (for a particular IoT device) and keep this information in both the E-UTRAN and the IoT device (UE) while the IoT device (UE) is in RRC_IDLE mode;

support the function on a base station (eNB) basis;

the S1-MME UE-associated signalling connection (for a particular IoT device) is kept between the base station (eNB) and the MME while that IoT device (UE) is in RRC_IDLE mode;

two new procedures, suspend and resume, are introduced with main impact on RRC and S1AP;

the bearer context data (for a particular IoT device) is kept in the base station (eNB) and the MME associated with that IoT device; and the suspend and resume procedures also require interaction between the MME and the serving gateway (S-GW) associated with the IoT device concerned.

Moreover, it is also foreseen that support will be provided for a functionality to resume a connection via a base station (eNB) that is different to the base station via which the connection was suspended. In case of a mobile originated (MO) call, resuming a connection via a different base station may be realised using the X2-based context fetch procedure disclosed in 3GPP R3-160462. As illustrated in FIG. 8 (source: 3GPP R3-160462), the X2-based context fetch procedure is performed between the new and old serving base stations of the IoT device (UE) and the procedure is triggered by the IoT device (UE) when it sends a request to the new serving base station (eNB) for resuming its RRC connection via that base station.

SUMMARY OF INVENTION

Technical Problem

However, such X2-based context fetch is not possible for mobile terminated (MT) calls (e.g. when the IoT device has not yet resumed its connection via a new base station) because in this case the IoT device (UE) does not provide any trigger for the new base station to perform a context fetch.

It is foreseen that paging messages (for a particular IoT device) are allowed to be sent within the already established UE-associated signalling connection (for that IoT device). When paging is successful within a cell of the base station that holds the suspended UE context (for the IoT device being paged), the resume procedure is triggered. However, in some cases it may not be possible to resume the connection for the IoT device when the IoT device (UE) cannot be paged via its old base station (where the IoT device may no longer be reachable after it has moved to a new cell) and the IoT device (UE) cannot be paged via its new base station either (where an associated UE context is not available).

Even if the MME is aware that the IoT device has changed its base station (e.g. based on a tracking area update (TAU) performed by the IoT device), the serving gateway and the MME remain configured to use (for paging the IoT device) an obsolete path towards the old serving base station until the new base station fetches the UE context from the old base station and switches the path corresponding to that UE context from the old base station to the new base station.

Whilst it may be possible to configure the IoT device to resume its connection (e.g. briefly) whenever it moves to a new cell and thereby ensure that paging messages/MT calls can be delivered to the IoT device, this would require additional signalling and hence it would reduce any power saving benefits from Solution 18. Moreover, resuming the connection even when the IoT device has no data to send would be against the goal set by 3GPP, i.e. to provide a lightweight data transmission solution for IoT devices.

Moreover, since some UEs and IoT devices (e.g. category-M UEs) are allowed to have multiple data radio bearers (DRBs) (up to 8 DRBs), all DRBs are resumed by the new base station (provided that the new base station has sufficient resources). Otherwise, when the new base station does not have sufficient resources, it is not possible to serve the IoT device via that base station, even if the IoT device does not require all its DRBs to be resumed (e.g. for an MT call).

The present invention seeks to address (at least partially) some of the issues concerning Solution 18 without significantly compromising on the requirement for providing a lightweight solution for IoT devices having the need to conserve energy and designed to operate over a narrow-band spectrum (and in large numbers, in the order of millions of devices in a real deployment).

Accordingly, preferred example embodiments of the present invention aim to provide methods and apparatus which address or at least partially deal with the above needs.

Although for efficiency of understanding for those of skill in the art, the invention will be described in detail in the context of a 3GPP system (UMTS, LTE), the principles of the invention can be applied to other systems in which communication devices or User Equipment (UE) access a core network using a radio access technology.

Solution to Problem

In one aspect, the invention provides a base station for a communication network, the base station comprising: a transceiver configured to receive, from a core network node, a resume identifier associated with a communication device within a cell of the communication network operated by the base station; and a controller configured to retrieve, based on the received resume identifier, a user equipment, 'UE', context for the communication device, for use in resumption, in the base station, of a previously suspended communication connection by the communication device.

In another aspect, the invention provides core network apparatus for a communication network, the core network apparatus comprising: a controller configured to obtain a resume identifier configured to identify a user equipment, 'UE', context associated with a previously established communication connection for a communication device; and a transceiver configured to send, to a base station, the obtained resume identifier.

In yet another aspect, the invention provides a communication device for a communication network, the communication device comprising: a transceiver configured to send, to core network apparatus, information identifying a current location of the communication device together with a resume identifier, for the communication device, for use in resumption of a previously suspended communication connection by the communication device.

In one aspect, the invention provides a base station for a communication network, the base station comprising: a transceiver configured to receive, from a communication device, a request for resuming a communication connection for the communication device, the request for resuming the communication connection including information identifying a number of radio bearers to be resumed; and a controller configured to obtain a user equipment, 'UE', context, for the communication device, and to set up at least one of the radio bearers to be resumed.

In another aspect, the invention provides core network apparatus for a communication network, the core network apparatus comprising a transceiver configured to: receive, from a base station, a request for resuming a user equipment, 'UE', context comprising information identifying a number of radio bearers to be resumed; and send, to the base station, a response to said request comprising information identifying at least one radio bearer (e.g. at least one E-RAB) to be set up.

In yet another aspect, the invention provides a communication device for a communication network, the communication device comprising a transceiver configured to send, to a base station of the communication network, a request for resuming a communication connection for the communication device, the request for resuming the communication connection including information identifying a number of radio bearers to be resumed.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

Example embodiments of the invention will now be described, by way of example, with reference to the accompanying drawings in which:

BRIEF DESCRIPTION OF DRAWINGS

FIG. 1 illustrates schematically a cellular telecommunication system to which example embodiments of the invention may be applied;

FIG. 2 is a block diagram of an IoT device forming part of the system shown in FIG. 1;

FIG. 3 is a block diagram of a base station forming part of the system shown in FIG. 1;

FIG. 4 is a block diagram of a mobility management entity forming part of the system shown in FIG. 1;

FIG. 5 is a timing diagram illustrating an exemplary way in which an example embodiment of the invention can be implemented in the system of FIG. 1;

FIG. 6 is a timing diagram illustrating an example exemplary way in which an example embodiment of the invention can be implemented in the system of FIG. 1;

FIG. 7 is a timing diagram illustrating an exemplary way in which an example embodiment of the invention can be implemented in the system of FIG. 1; and FIG. 8 is a timing diagram illustrating an X2-based context fetch procedure.

DESCRIPTION OF EMBODIMENTS

<Overview>

FIG. 1 schematically illustrates a telecommunications network 1 in which IoT devices 3, mobile telephones (denoted 'UE'), and other communication devices (not shown) can communicate with each other via E-UTRAN base stations 5 and a core network 7 using an E-UTRA radio access technology (RAT). As those skilled in the art will appreciate, whilst one IoT device 3, two mobile telephones UE, and two base stations 5-1, 5-2 are shown in FIG. 1 for illustration purposes, the system, when implemented, will typically include other base stations and communication devices.

Each base station 5 operates one or more associated cell. In this example, the first base station 5-1 operates 'Cell 1' and the second base station 5-2 operates 'Cell 2'. Communication devices may connect to either cell (depending on their location and possible on other factors, e.g. signal conditions, subscription data, capability, and/or the like) by establishing a radio resource control (RRC) connection with the appropriate base station 5 operating that cell. As can be seen, the IoT device 3 is located in an area where the cells operated by the base stations 5-1 and 5-2 partially overlap. Thus, when operating in RRC idle mode (not sending/receiving data), the IoT device 3 camps on the cell having the best signal quality, and when in RRC active mode, the IoT device 3 communicates data via that cell.

The base stations 5 are connected to the core network 7 via an S1 interface and to each other via an X2 interface (not shown). The core network 7 includes a mobility management entity (MME) 9, and a serving gateway (S-GW) 10 and a packet data network gateway (P-GW) 11 for providing a connection between the base stations 5 and other networks (such as the Internet) and/or servers hosted outside the core network 7.

The MME 9 is the network node responsible for keeping track of the locations of the mobile communication devices (the mobile telephones and the IoT device 3) within the communications network 1. In particular, the MME 9 stores an identifier of the mobile communication devices' last known cell (or tracking area) so that they can be notified when there is an incoming (voice or data) call for them and that a communication path is set up via the base station 5 currently serving the particular mobile communication device.

In the following examples, the IoT device 3 connects to the network at specific intervals (and/or whenever one of its application needs to communicate with the network) for sending data to a remote server (or another communication device). The operation of the IoT device 3 of this example embodiment is automated and capable of operating essentially autonomously. It will be appreciated, however, that the IoT device 3 may perform certain activities based on inputs received from a local or a remote user (e.g. remote (re) configuration of measurement criteria or out of schedule measurement performance and/or reporting). In addition, the IoT device 3 may be operated by a user in a similar manner to a mobile telephone.

As illustrated by a dashed arrow, the IoT device 3 previously connected to the first base station 5-1 (via Cell 1) and thus the first base station 5-1 maintains an associated UE context. However, as illustrated by an arrow in continuous line, the IoT device 3 is now reachable via the second base station 5-2 (via Cell 2), e.g. due to a change in signal conditions in Cell 1 and/or movement of the IoT device 3.

However, since the IoT device 3 currently has no active connections with the network (e.g. the IoT device 3 operates in RRC_IDLE mode), it is not configured to resume its RRC connection via the new base station 5-2, even after it is no longer reachable via the old base station 5-1.

Instead, the IoT device 3 attempts to register itself with the MME 9 by sending an appropriately formatted tracking area update (TAU) request (and/or a similar suitable signalling message) to the MME 9 (via the new serving base station 5-2).

Effectively, the TAU request (and/or the like) from the IoT device 3 indicates to the MME 9 that the IoT device 3 has changed cells (in this example, from Cell 1 to Cell 2), which beneficially allows the MME 9 to notify the new serving base station 5-2 that the base station 5-2 needs to fetch the UE context associated with the IoT device 3 from the old serving base station 5-1 (and perform an appropriate path switch procedure for switching the path at the S-GW 10). Therefore, in this example, the IoT device 3 can maintain its context via the new serving base station 5-2 even without sending a request to resume its connection via that base station 5-2 (for example, when the IoT device 3 continues to operate in RRC_IDLE node). Accordingly, it is possible to avoid unnecessary signalling between the IoT device 3 and its serving base station(s) 5 and reduce the risk of not being able to reach the IoT device 3 (e.g. MT case) when it has moved/changed cells from the old base station 5-1 to the new base station 5-2 whilst in RRC idle mode.

Thus, the MME can beneficially use the already established UE context for paging the IoT device 3, e.g. in case of a mobile terminated call, regardless of whether or not the IoT device 3 in question has an active RRC connection (via either base station 5-1 or 5-2).

In another example, further signalling and/or resource optimisations (and associated power saving in the IoT device 3) may be achieved, when the IoT device 3 resumes its connection via a serving base station 5, e.g. when responding to a paging message from the MME 9 in relation to an MT call. Specifically, when the IoT device 3 sends a resume request (such as an RRC Connection Resume Request and/or the like) to the serving base station 5, it includes in this request information identifying the connection to be resumed and how many and/or which data radio bearers (DRBs) it needs to resume. Beneficially, by indicating to the network how many and/or which DRBs it needs to resume for the resumed connection, it is possible to avoid resuming those DRBs that the IoT device 3 does not require for the resumed connection (and thereby free up communication resources at the IoT device and the serving base station 5) and/or avoid a failure to resume the connection at the base station 5 (e.g. when the base station 5 does not have sufficient resources to resume all DRBs associated with the IoT device 3 even though it has sufficient resources for resuming some of those DRBs).

Based on the information identifying the DRBs that the IoT device 3 wishes to resume, the serving base station 5 is able to perform appropriate admission control and RRC re-configuration with respect to the identified DRBs (and inform the MME accordingly). However, in this example, the serving base station 5 is configured not to resume any DRB associated with the IoT device 3 (as per the relevant UE context held at the base station 5) that the IoT device 3 did not explicitly indicate to be resumed.

Beneficially, it is possible to provide better service continuity and more efficient resource usage at the IoT device (UE) and its serving base station when the IoT device moves to and/or resumes its connection via a new serving base station.

<IoT Device>

FIG. 2 is a block diagram illustrating the main components of the IoT device 3 shown in FIG. 1 (or a mobile telephone configured to operate as an IoT device 3). As shown, the IoT device 3 has a transceiver circuit 31 that is operable to transmit signals to and to receive signals from a base station 5 via one or more antenna 33. The IoT device 3 has a controller 37 to control the operation of the IoT device 3. The controller 37 is associated with a memory 39 and is coupled to the transceiver circuit 31. Although not necessarily required for its operation, the IoT device 3 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the IoT device 3 by, in this example, program instructions or software instructions stored within the memory 39. As shown, these software instructions include, among other things, an operating system 41, a communications control module 43, a UE context module 45, an RRC module 46, and a NAS module 49.

The communications control module 43 is operable to control the communication between the IoT device 3 and its serving base station 5 (and other communication devices connected to the serving base station 5, such as further IoT devices, mobile telephones, core network nodes, etc.).

The UE context module 45 is responsible for handling (such as obtaining, generating, modifying, storing, and/or transferring) UE context associated with the IoT device 3 for use in communicating via a serving base station 5.

The RRC module 46 is operable to generate, send and receive signalling messages formatted according to the RRC standard. For example, such messages are exchanged between the IoT device 3 and its serving base station 5. The RRC messages may include, for example, messages relating to resuming a previous RRC connection via a new serving base station 5.

The NAS module 49 is operable to generate, send and receive signalling messages formatted according to the NAS standard. For example, such messages are exchanged between the IoT device 3 and the MME 9 (via the serving base station 5, using the RRC module 46). The NAS messages may include, for example, messages relating to registering and/or updating a tracking area (or cell) where the IoT device 3 is currently located.

<Base Station>

FIG. 3 is a block diagram illustrating the main components of a base station 5 shown in FIG. 1. As shown, the base station 5 has a transceiver circuit 51 for transmitting signals to and for receiving signals from the communication devices (such as IoT devices 3/mobile telephones) via one or more antenna 53, a core network interface 55 (e.g. an S1 interface) for transmitting signals to and for receiving signals from the core network 7, and a base station interface 56 (e.g. an X2 interface) for transmitting signals to and for receiving signals from neighbouring base stations. The base station 5 has a controller 57 to control the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communications network 1 or from a removable data storage device (RMD), for example. The controller 57 is configured to control the overall operation of the base station 5 by, in this example, program instructions or software instructions stored within the memory 59. As shown, these software instructions include, among other things, an operating system 61, a communications control module 63, a UE context module 65, an RRC module 66, an X2 module 67, and an S1AP module 68.

The communications control module 63 is operable to control the communication between the base station 5 and IoT devices 3, mobile telephones, and other network entities that are connected to the base station 5. The communications control module 63 also controls the separate flows of downlink user traffic (via associated data radio bearers) and control data to be transmitted to the communication devices associated with this base station 5 including, for example, control data for managing operation of the IoT device 3 and/or the mobile telephones.

The UE context module 65 is responsible for handling (such as obtaining, generating, modifying, storing, and/or transferring) UE context associated with user equipment (e.g. the IoT device 3) connected to the base station 5.

The RRC module 66 is operable to generate, send and receive signalling messages formatted according to the RRC standard. For example, such messages are exchanged between the base station 5 and the IoT device 3 (and other communication devices within the cell of the base station 5). The RRC messages may include, for example, messages relating to resuming a previous RRC connection (e.g. a set of data radio bearers) for an IoT device 3 via this base station 5 as a new serving base station.

The X2 module 67 is operable to generate, send and receive signalling messages (X2 messages) formatted according to the X2AP standard. The X2 messages may include, for example, messages relating to the transfer/fetching of UE context between neighbouring base stations.

The S1AP module 68 is operable to generate, send and receive signalling messages formatted according to the S1AP standard. For example, such messages are exchanged between the base station 5 and the mobility management entity 9. The S1AP messages may include, for example, messages relating to registering the location of the IoT device/user equipment in a cell of the base station (e.g. a TAU message from the IoT device 3) and/or associated responses.

<Mobility Management Entity>

FIG. 4 is a block diagram illustrating the main components of the mobility management entity 9 shown in FIG. 1. As shown, the mobility management entity 9 has a transceiver circuit 71 for transmitting signals to and for receiving signals from the base stations 5 (and/or communication devices connected to the base stations 5) via a base station interface 75 (e.g. an S1 interface). The mobility management entity 9 has a controller 77 to control the operation of the mobility management entity 9. The controller 77 is associated with a memory 79. Although not necessarily shown in FIG. 4, the mobility management entity 9 will of course have all the usual functionality of a cellular telephone network mobility management entity and this may be provided by any one or any combination of hardware, software and firmware, as appropriate. Software may be pre-installed in the memory 79 and/or may be downloaded via the communications network 1 or from a removable data storage device (RMD), for example. The controller 77 is configured to control the overall operation of the mobility management entity 9 by, in this example, program instructions or software instructions stored within the memory 79. As shown, these software instructions include, among other things, an operating system 81, a communications control module 83, a UE location registration module 85, an S1AP module 88, and a NAS module 89.

The communications control module 83 is operable to control the communication between the mobility management entity 9 and the base stations 5, IoT devices 3, mobile telephones, and other network entities that are connected to the mobility management entity 9.

The UE location registration module 85 is responsible for keeping track of current location of user equipment (such as mobile telephones, IoT devices, and/or the like) connected to the MME 9.

The S1AP module 88 is operable to generate, send and receive signalling messages formatted according to the S1AP standard. For example, such messages are exchanged between the mobility management entity 9 and connected base stations 5. The S1AP messages may include, for example, messages relating to (e.g. triggering) fetching of a UE context and/or resuming one or more data radio bearers for the IoT device 3 via the base station 5.

The NAS module 89 is operable to generate, send and receive signalling messages formatted according to the NAS standard. For example, such messages are exchanged between the MME 9 and the IoT device 3 (via a base station 5, using the S1AP module 88). The NAS messages may include, for example, messages relating to registering and/or updating a tracking area (or cell) where the IoT device 3 is currently located.

In the above description, the IoT device 3, the base station 5, and the mobility management entity 9 are described for ease of understanding as having a number of discrete modules (such as the communications control modules and the UE context modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A more detailed description will now be given (with reference to FIGS. 5 to 7) of the scenario discussed above where an IoT device moves to a new base station, via which it can be paged using its existing UE context and via which the IoT device is able to resume its connection with the network (e.g. resume an appropriate number of data radio bearers).

<Operation—First Example>

FIG. 5 is a timing diagram (message sequence chart) illustrating an example process performed by components of the system 1 when performing a context fetch operation for an IoT device 3 (or a UE).

Initially, the IoT device 3 and the old base station 5-1 (denoted 'eNB-1' in FIG. 5) store the UE context and an appropriate Resume ID associated with the IoT device 3. It will be appreciated that this UE context was generated during an earlier RRC connection between the IoT device 3 and the old base station 5-1 (e.g. while the IoT device 3 was communicating via Cell 1 of the base station 5-1). The IoT device 3 currently operates in RRC_IDLE mode.

When the IoT device 3 leaves the area (Cell 1) served by the old base station 5-1 (and/or the signal conditions in Cell 1 deteriorate), the IoT device 3 selects a new cell to camp on that has more favourable signal conditions. In this example the IoT device 3 selects and camps on Cell 2 which is operated by the second base station 5-2 (denoted 'eNB-2' in FIG. 5).

As generally shown in step S501, the IoT device 3 generates (using its NAS module 49) and sends an appropriately formatted signalling message (e.g. a TAU request) to the MME 9 to register Cell 2 as the new location of the IoT device 3. The IoT device 3 includes in this signalling message the Resume ID associated with the IoT device 3.

In step S502, based on the received information (e.g. Resume ID, information identifying the new base station 5-2/Cell 2), the MME 9 determines that the IoT device 3 changed its network attachment (e.g. changed its cell/base station) and updates the data held in its UE location registration module 85 accordingly (e.g. the MME 9 deletes Cell 1 as the current location for the IoT device 3 and saves Cell 2 as the current location for the IoT device 3).

However, the MME 9 is also configured to generate (using its S1AP module 88) and send, in step S505, an appropriately formatted signalling message to the new base station 5-2 indicating that the IoT device 3 changed its network attachment and requesting the new base station 5-2 to fetch the UE context for the IoT device 3 from the old base station 5-1. Specifically, in this example, the MME 9 generates and sends a 'Context Fetch Trigger' S1AP message (and/or the like) to the new base station 5-2 and includes in this message: (optionally) information identifying the old base station 5-1 (e.g. by an appropriate 'eNB ID'); the Resume ID received from the IoT device 3; and information identifying the IoT device 3 for the MME 9 (e.g. a new 'MME UE S1AP ID').

Beneficially, the message from the MME 9 that includes the Resume ID serves as a trigger for the new base station 5-2 to initiate an appropriate procedure for fetching the UE context associated with the IoT device 3. Therefore, as generally shown in steps S506 and S507, the new base station 5-2 and the old base station 5-1 carry out an appropriate X2-based context fetch operation (e.g. as described in 3GPP R3-160550).

In more detail, when the base station 5-2 determines that the UE context associated with this IoT device 3/Resume ID is not available at this base station 5-2, it attempts to identify the old base station 5-1 based on the information received from the MME 9, such as the Resume ID and/or the eNB ID (if sent in step S505). The rest of the process is in accordance with the procedure described in 3GPP R3-160550.

If the new base station 5-2 is able to identify the old base station 5-1 based on the information received from the MME 9, then the new base station 5-2 proceeds to generate (using its X2 module 67) and send, in step S506, an appropriately formatted signalling message to the old base station 5-1 for obtaining the UE context associated with the IoT device 3. The new base station 5-2 includes in this message (e.g. a 'Retrieve UE Context Request' X2-AP message) the Resume ID (and/or other suitable information) associated with the IoT device 3.

If the old base station 5-1 is able to match the Resume ID received in step S506 with a UE context (in its UE context module 65), then the old base station 5-1 retrieves the associated UE context from its UE context module 65, and sends, in step S507, the UE context to the new base station 5-2 by including the UE context in an appropriately formatted X2-AP signalling message (e.g. a 'Retrieve UE Context Response' message).

At the end of this fetching procedure, the new base station 5-2 saves (in its UE context module 65) the UE context associated with the IoT device 3.

The new base station 5-2 also proceeds to request the MME 9 to switch (in the MME 9 and the S-GW 10) the path associated with the fetched UE context from the old base station 5-1 to the new base station 5-2. In order to do so, the new base station 5-2 generates (using its S1AP module 68) and sends, in step S508, and appropriate path switch request to the MME 9, in response to which the MME 9 updates the path (not shown in FIG. 5) and once the path switch is complete, the MME 9 generates and returns an appropriate acknowledgement to the new base station 5-2 (in step S509).

Effectively, by performing the path switch procedure, the new base station 5-2 and the S-GW 10 are able to establish an S1 UE associated signalling connection to the serving MME 9 and the MME 9 is able to resume the UE context and any related bearer contexts in the core network 7 and update the downlink path for the IoT device 3.

If appropriate, the new base station 5-2 also informs the old base station 5-1 that the old base station 5-1 can release the UE context associated with the IoT device 3 (in step S510 by generating and sending an appropriately formatted X2-AP 'UE context release' message).

It is noted that, at this point, since the IoT device 3 (or the MME 9) has not yet requested to resume the suspended RRC connection for the IoT device 3, the new base station 5-2 does not proceed to resuming the RRC connection associated with the Resume ID received from the MME 9 (in step S505).

However, as the UE context is now available at the new base station 5-2, the MME 9 is beneficially able to page the IoT device 3 (as shown in S511, e.g. in case of an MT call) via the correct base station 5-2 and the IoT device 3 is able to resume its RRC connection via the new base station 5-2 without delay (e.g. in case of an MO call) since the base station 5-2 does not need to perform a context fetch procedure anymore.

<Operation—Second Example>

FIG. 6 is a timing diagram (message sequence chart) illustrating another example process performed by components of the system 1 when performing a context fetch operation for an IoT device 3 (or a UE). In this example, which is a modification of the example described with reference to FIG. 5, the MME 9 obtains the Resume ID associated with the IoT device 3 from the old base station 5-1. In other words, the Resume ID associated with the IoT device 3 is not provided by the IoT device 3, but by a previous (old) serving base station 5 upon a request from the MME 9 (e.g. using a class-1 procedure as shown in FIG. 6).

Initially, the IoT device 3 and the old base station 5-1 ('eNB-1' in FIG. 6) store the UE context and an appropriate Resume ID associated with the IoT device 3. The IoT device 3 currently operates in RRC_IDLE mode.

When the IoT device 3 leaves the area (Cell 1) served by the old base station 5-1 (and/or the signal conditions in Cell 1 deteriorate), the IoT device 3 selects a new cell to camp on that has more favourable signal conditions. In this example the IoT device 3 selects and camps on Cell 2 which is operated by the second base station 5-2 ('eNB-2' in FIG. 6).

As generally shown in step S601, the IoT device 3 generates (using its NAS module 49) and sends an appropriately formatted signalling message (e.g. a TAU request) to the MME 9 to register Cell 2 as the new location of the IoT device 3. However, in this case the IoT device 3 does not include any Resume ID in the TAU message.

In step S602, based on e.g. information identifying the new base station 5-2/Cell 2, the MME 9 determines that the IoT device 3 changed its network attachment (e.g. changed its cell/base station) and updates the data held in its UE location registration module 85 accordingly (e.g. the MME 9 deletes Cell 1 as the current location for the IoT device 3 and saves Cell 2 as the current location for the IoT device 3).

However, in this example, the MME 9 is also configured to generate (using its S1AP module 88) and send, in step S603, an appropriately formatted signalling message to the old base station 5-1 requesting the Resume ID associated with the IoT device 3 from the old base station 5-1. Specifically, in this example, the MME 9 generates and sends a 'GetUEResumeIdRequest' S1AP message (and/or the like) to the old base station 5-1 and includes in this message information identifying the old base station 5-1 (e.g. by an appropriate 'eNB ID') and information identifying the IoT device 3 (e.g. an 'MME UE S1AP ID' and/or an 'eNB UE S1AP ID' known to the old base station 5-1).

If the old base station 5-1 is able to match the information identifying the IoT device 3 (e.g. the 'MME UE S1AP ID' received in step S506) with a Resume ID, then the old base station 5-1 generates (using its S1AP module 68) and sends, in step S604, the Resume ID to the MME 9 by including the Resume ID in an appropriately formatted signalling message (e.g. a 'GetUEResumeIdResponse' S1AP message and/or the like).

Next, in step S605 which effectively corresponds to step S505, the MME 9 indicates that the IoT device 3 changed its network attachment and requests the new base station 5-2 to fetch the UE context for the IoT device 3 from the old base station 5-1. The MME 9 includes in this request the Resume ID obtained from the old base station 5-1.

Steps S606 to S611 generally correspond to step S506 to S511, respectively, that have been described above with reference to FIG. 5. Their description is omitted herein for simplicity.

Beneficially, as the UE context can be fetched by the new base station 5-2 even in the absence of a resume request from the IoT device 3, the MME 9 is able to page the IoT device 3 (e.g. in case of an MT call) via the correct base station 5-2 and the IoT device 3 is able to resume its RRC connection via the new base station 5-2 without delay (e.g. in case of an MO call) since the base station 5-2 does not need to perform a context fetch procedure anymore.

<Operation—Third Example>

FIG. 7 is a timing diagram (message sequence chart) illustrating another exemplary process performed by components of the system 1 when performing a resumption of a data connection for an IoT device 3 via a base station 5. In this case, the IoT device 3 has a plurality of (suspended) radio data bearers and when it is resuming its data connection, the IoT device 3 informs the (new) base station 5 how many and/or which bearers the base station 5 needs to resume.

Similarly to the previous examples, the IoT device 3 and its (old) serving base station (e.g. the base station 5 shown in FIG. 7 or another base station) store the UE context (including information relating to the DRBs associated with the IoT device 3) and an appropriate Resume ID associated with the IoT device 3. The IoT device 3 currently operates in RRC_IDLE mode and its network connection is suspended.

When the IoT device 3 needs to communicate with (has data to send to) the network (and/or a communication endpoint via the network), the IoT device 3 generates (using its RRC module 46) and sends, in step S701, an appropriately formatted RRC signalling message to the base station 5 (which may be the base station that suspended the connection or a new base station e.g. if the IoT device changed cells) requesting the base station 5 to resume the suspended network connection for the IoT device 3.

Beneficially, in this example, the IoT device 3 includes in its request (e.g. an 'RRCConnectionResume' message and/or the like) information identifying how many and/or which bearers (DRBs) the base station 5 needs to resume for the IoT device 3. It will be appreciated that the number of DRBs and/or the selection of the DRBs to be resumed may be determined by the IoT device 3 based on the amount and/or type of data it needs to communicate. For example, the IoT device 3 may have a one or more uplink DRBs and one or more downlink DRBs (different to the uplink DRBs). The IoT device 3 may also have one or more uplink/downlink DRBs associated with a first application and one or more (different) DRBs associated with a second application. Thus, depending on the type of connection required (uplink/downlink) and/or the application the IoT device 3 is beneficially able to request resuming the DRB(s) associated with that connection/application.

In response to the request from the IoT device 3, the base station 5 is configured to generate (using its S1AP module 68) and send, in step S702, an appropriately formatted S1 signalling message (e.g. a 'UE context resume request' and/or the like) to the MME 9 requesting the MME 9 to authorise/resume the requested network connection for the IoT device 3. The base station 5 also includes in this S1 message the information identifying how many and/or which bearers (DRBs) the base station 5 needs to resume for the IoT device 3.

The MME 9 determines whether or not the IoT device's request can be accommodated (e.g. whether or not the IoT device 3 is authorised to communicate via that base station 5). If the request can be accommodated, the MME 9 proceeds to generate (using its S1AP module 88) and send, in step S703, an appropriately formatted S1 signalling message to the base station 5 informing the base station 5 whether it can resume the data connection for the IoT device 3. Beneficially, the MME 9 also includes in this message (e.g. a 'UE context resume response' and/or the like) information identifying (e.g. a list of) the E-UTRAN Radio Access Bearers (E-RABs) to be set up by the base station 5 corresponding to the DRBs to be resumed for the IoT device 3. If the request from the IoT device 3 cannot be accommodated, the MME 9 returns an appropriate rejection message to the base station 5, which informs the IoT device 3 about the failure to resume the requested DRBs. It will be appreciated that the request from the IoT device 3 may only be partially accommodated (e.g. with respect to some of the requested DRBs but not all requested DRBs), in which case the MME 9 informs the base station 5 about the E-RABs corresponding to only those DRBs that are possible to resume for the IoT device 3 (and the MME 9 may optionally return an appropriate rejection for any DRBs that cannot be resumed).

As generally shown in step S704, the base station 5 performs appropriate admission control and RRC reconfiguration in order to set up the E-RABs for the IoT device 3 corresponding to the DRBs to be resumed. After a successful RRC reconfiguration, the base station 5 informs the MME 9, by generating and sending an appropriate S1 signalling message (e.g. 'UE context response complete'), about the E-RAB(s) that have been configured for the IoT device 3 (e.g. in the form of an E-RAB setup list and/or the like). If any the base station 5 failed to set up any of the requested E-RABs, it may also include information identifying such failed E-RAB(s) (e.g. in the form of an E-RAB failure list and/or the like).

Following admission control and RRC reconfiguration, the IoT device 3 is able to communicate data over the configured E-RAB(s) with other nodes (via the base station 5 and the S-GW 10), as generally illustrated in step S710. It will be appreciated that the MME 9 is able to coordinate activation of the required paths between the base station 5 and the S-GW 10 by correctly identifying and notifying the Tunnel Endpoint IDs (TEIDs) associated with the resumed connection.

Beneficially, by indicating to the MME how many and/or which DRBs the IoT device needs to resume, it is possible to avoid resuming those DRBs that the IoT device does not require for its resumed connection (and thereby free up communication resources at the IoT device and the serving base station) and/or avoid a failure to resume the connection (e.g. when the serving base station does not have sufficient resources to resume all DRBs associated with the IoT device even though it has sufficient resources for resuming some of the requested DRBs).

Moreover, it is possible to provide better service continuity and more efficient resource usage at the IoT device and its serving base station when the IoT device moves to and/or resumes its connection via a new serving base station.

<Modifications and Alternatives>

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that the resume request sent by the IoT device in step S701 of FIG. 7 may include a full service request (e.g. an appropriate RRC/NAS request) specifying the details of the connection to be resumed. It will be appreciated that such service request may comprise an appropriately formatted mobile originated data (mo-data) NAS Service Request that enables the MME to decide about the bearer(s) to be established (and associated QoS) for the IoT device (the MME's decision may be based on input from other core network entities such as a Policy and Charging Rules Function (PCRF), Home Subscriber Server (HSS), etc).

Alternatively, the resume request may include information identifying each DRB (one or more specific DRB) that the IoT device requests to resume. In another example, the resume request may include information identifying the number of DRB that the IoT device requests to resume (i.e. how many DRBs to resume rather than specifying which DRBs to resume). This may be necessary, e.g. due to insufficient space in the Signalling Radio Bearer #0 (SRB0) carrying the resume request (between the IoT device and the base station). In the absence of a service request and/or information identifying the exact bearer(s) to be resumed (e.g. by their associated bearer identities), the network may be configured to resume any appropriate bearer associated with the IoT device (UE), for example, the bearer with the highest QoS assigned to this IoT device (UE) at the time of suspension.

It will also be appreciated that step S704 (admission control and RRC reconfiguration) may also include (or it may be preceded by) fetching of the corresponding UE context from the old serving base station of the IoT device (e.g. as described above with reference to steps S506 and S507).

In the above example embodiments, an X2 connection is provided between the base stations and the new serving base station is described to retrieve the UE context associated with the IoT device (UE) over the X2 connection (e.g. in steps S506-S507 or S606-S607). However, it will also be appreciated that in case there is no X2 connection provided between the new base station and the old base station, the MME may be configured to retrieve the UE context from the old base station (e.g. using the S1 connection between the MME and the old base station) and supply the retrieved UE context to the new base station (e.g. using the S1 connection between the MME and the new base station).

It will be appreciated that whilst example embodiments of the invention have been described with particular reference to Internet of Things (or machine-type) data transmissions (e.g. transmission of data acquired during measurement events and the like), the data sent may comprise any form of data depending on the application in which the communication device is being used. For example, the above example embodiments may be applicable for transmitting other data such as user data, backup data, synchronisation data, diagnostic data, monitoring data, usage statistics, error data and/or the like.

In the above example embodiments, the IoT devices are automated devices. It will be appreciated that the above example embodiments might be implemented using other devices than automated equipment such as, for example, mobile telephones (smartphones), personal digital assistants, laptop/tablet computers, web browsers, e-book readers, etc.

In the above example embodiments, a 3GPP radio communications (radio access) technology is used. However, any other radio communications technology (i.e. WLAN, Wi-Fi, WiMAX, Bluetooth, etc.) can be used for managing transmissions of IoT devices in accordance with the above embodiments. The above example embodiments are also applicable to 'non-mobile' or generally stationary user equipment.

Examples of IoT Applications

Some examples of Internet of Things (or MTC) applications are listed in the following table (source: 3GPP TS 22.368 V13.1.0, Annex B). This list is not exhaustive and is intended to be indicative of the scope of Internet of Things/machine-type communication applications.

TABLE 1

| Service Area | IoT applications |
| --- | --- |
| Security | Surveillance systems |
| | Backup for landline |
| | Control of physical access |
| | (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

In the above description, the IoT device, the base station, and the MME are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above example embodiments, a number of software modules were described. As those skilled in the art will appreciate, the software modules may be provided in compiled or un-compiled form and may be supplied to the base station, to the mobility management entity, to the IoT device, or to other user equipment (such as mobile telephones) as a signal over a computer network, or on a recording medium. Further, the functionality performed by part or all of this software may be performed using one or more dedicated hardware circuits. However, the use of software modules is preferred as it facilitates the updating of the base station, the mobility management entity, or the IoT device (or a mobile telephone having IoT functionality, e.g. an MTC application) in order to update their functionalities.

The transceiver of the base station may be configured to retrieve the UE context from a local memory or from another base station. For example, the transceiver may be configured to retrieve the context from another base station by sending at least one signalling message (e.g. a 'Retrieve UE Context Request') including information identifying the UE context (e.g. a Resume ID).

The controller of the core network apparatus may be configured to obtain the resume identifier from the communication device (e.g. from a tracking area update, TAU, message transmitted by the communication device) or from another base station (e.g. using an appropriate S1-AP procedure for retrieving the resume identifier).

The controller of the core network apparatus may be configured to determine that the communication device changed its network attachment (e.g. between base stations of the communication network), and the transceiver may be configured to send the obtained resume identifier when it is determined that the communication device changed its network attachment.

The transceiver of the communication device may be configured to send the information identifying a current location of the communication device within a tracking area update (TAU) message transmitted towards the core network apparatus.

The transceiver of the base station may be configured to provide, to core network apparatus, the information identifying a number of radio bearers to be resumed and to receive, from the core network apparatus, a message comprising information identifying at least one radio bearer (e.g. at least one E-RAB) to be set up, and the controller of the base station may be configured to set up the at least one radio bearer so identified.

The request for resuming the communication connection may comprise one of: a request for establishing a radio resource control, RRC, connection; and a request for resuming an RRC connection.

The core network apparatus may comprise a mobility management entity (MME). The communication device may comprise at least one of: user equipment (UE) according to a 3GPP standard; an 'internet of things' (IoT) device; a machine-type communications (MTC) device; a machine-to-machine (M2M) communication device; and a mobile telephone.

Various other modifications will be apparent to those skilled in the art and will not be described in further detail here.

The whole or part of the example embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary note 1) A base station for a communication network, the base station comprising:

a transceiver configured to receive, from a core network node, a resume identifier associated with a communication device within a cell of the communication network operated by the base station; and a controller configured to retrieve, based on the received resume identifier, a user equipment, 'UE', context for the communication device, for use in resumption, in the base station, of a previously suspended communication connection by the communication device.

(Supplementary note 2) The base station according to Supplementary note 1, wherein the transceiver is configured to retrieve the UE context from a local memory or from another base station.

(Supplementary note 3) The base station according to Supplementary note 2, wherein the transceiver is configured to retrieve the UE context from another base station by sending at least one signalling message (e.g. a 'Retrieve UE Context Request') including information identifying the UE context (e.g. a Resume ID).

(Supplementary note 4) Core network apparatus for a communication network, the core network apparatus comprising:

a controller configured to obtain a resume identifier configured to identify a user equipment, 'UE', context associated with a previously established communication connection for a communication device; and a transceiver configured to send, to a base station, the obtained resume identifier.

(Supplementary note 5) The core network apparatus according to Supplementary note 4, wherein the controller is configured to obtain the resume identifier from the communication device (e.g. from a tracking area update, TAU, message transmitted by the communication device) or from another base station (e.g. using an appropriate S1-AP procedure for retrieving the resume identifier).

(Supplementary note 6) The core network apparatus according to Supplementary note 4 or 5, wherein the controller is configured to determine that the communication device changed its network attachment (e.g. between base stations of the communication network), and wherein the transceiver is configured to send the obtained resume identifier when it is determined that the communication device changed its network attachment.

(Supplementary note 7) A communication device for a communication network, the communication device comprising:

a transceiver configured to send, to core network apparatus, information identifying a current location of the communication device together with a resume identifier, for the communication device, for use in resumption of a previously suspended communication connection by the communication device.

(Supplementary note 8) The communication device according to Supplementary note 7, wherein the transceiver is configured to send the information identifying a current location of the communication device within a tracking area update, TAU, message transmitted towards the core network apparatus.

(Supplementary note 9) A base station for a communication network, the base station comprising:
a transceiver configured to receive, from a communication device, a request for resuming a communication connection for the communication device, the request for resuming the communication connection including information identifying a number of radio bearers to be resumed; and
a controller configured to obtain a user equipment, 'UE', context, for the communication device, and to set up at least one of the radio bearers to be resumed.

(Supplementary note 10) The base station according to Supplementary note 9, wherein the transceiver is configured to provide, to core network apparatus, the information identifying a number of radio bearers to be resumed and to receive, from the core network apparatus, a message comprising information identifying at least one radio bearer (e.g. at least one E-RAB) to be set up, and wherein the controller is configured to set up the at least one radio bearer so identified.

(Supplementary note 11) The base station according to Supplementary note 9 or 10, wherein the request for resuming the communication connection comprises one of: a request for establishing a radio resource control, RRC, connection; and a request for resuming an RRC connection.

(Supplementary note 12) Core network apparatus for a communication network, the core network apparatus comprising a transceiver configured to:
receive, from a base station, a request for resuming a user equipment, 'UE', context comprising information identifying a number of radio bearers to be resumed; and
send, to the base station, a response to said request comprising information identifying at least one radio bearer (e.g. at least one E-RAB) to be set up.

(Supplementary note 13) The core network apparatus according to any one of Supplementary notes 4 to 6 or claim 12, comprising a mobility management entity, MME.

(Supplementary note 14) A communication device for a communication network, the communication device comprising:
a transceiver configured to send, to a base station of the communication network, a request for resuming a communication connection for the communication device, the request for resuming the communication connection including information identifying a number of radio bearers to be resumed.

(Supplementary note 15) The communication device according to Supplementary note 7 or 8 or 14, wherein the communication device comprises at least one of: user equipment according to a 3GPP standard; an 'internet of things', IoT, device; a machine-type communications, MTC, device; a machine-to-machine, M2M, communication device; and a mobile telephone.

(Supplementary note 16) A system comprising: the base station according to any one of Supplementary notes 1 to 3 and 9 to 11; the core network apparatus according to any one of Supplementary notes 4 to 6, 12, and 13; and the communication device according to any one of Supplementary notes 7, 8, 14, and 15.

(Supplementary note 17) A method performed by a base station of a communications network, the method comprising:
receiving, from a core network node, a resume identifier associated with a communication device within a cell of the communication network operated by the base station; and
retrieving, based on the received resume identifier, a user equipment, 'UE', context for the communication device, for use in resumption, in the base station, of a previously suspended communication connection by the communication device.

(Supplementary note 18) A method performed by core network apparatus of a communications network, the method comprising:
obtaining a resume identifier configured to identify a user equipment, 'UE', context associated with a previously established communication connection for a communication device; and
sending, to a base station, the obtained resume identifier.

(Supplementary note 19) A method performed by a communication device, the method comprising:
sending, to core network apparatus, information identifying a current location of the communication device together with a resume identifier, for the communication device, for use in resumption of a previously suspended communication connection by the communication device.

(Supplementary note 20) A method performed by a base station of a communications network, the method comprising:
receiving, from a communication device, a request for resuming a communication connection for the communication device, the request for resuming the communication connection including information identifying a number of radio bearers to be resumed; and
obtaining a user equipment, 'UE', context, for the communication device, and to set up at least one of the radio bearers to be resumed.

(Supplementary note 21) A method performed by core network apparatus of a communications network, the method comprising:
receiving, from a base station, a request for resuming a user equipment, 'UE', context comprising information identifying a number of radio bearers to be resumed; and
sending, to the base station, a response to said request comprising information identifying at least one radio bearer (e.g. at least one E-RAB) to be set up.

(Supplementary note 22) A method performed by a communication device, the method comprising:
sending, to a base station of the communication network, a request for resuming a communication connection for the communication device, the request for resuming the communication connection including information identifying a number of radio bearers to be resumed.

(Supplementary note 23) A computer program product comprising computer implementable instructions for causing a programmable computer device to perform the method according to any one of Supplementary notes 17 to 22.

This application is based upon and claims the benefit of priority from United Kingdom Patent Application No. 1605466.0, filed on Mar. 31, 2016, the disclosure of which is incorporated herein in its entirety by reference.

The invention claimed is:
1. A method for a base station for a communication network, the method comprising:
receiving, from a core network node, a resume identifier associated with a communication device, the resume identifier identifying another base station to which the communication device was previously connected and suspended; and retrieving from the another base station, based on the resume identifier, a user equipment ("UE") context for the communication device, for use in resumption, in the base station, of a previously suspended communication connection by between the communication device and the another base station.

2. The method according to claim 1, wherein the retrieving is performed by sending at least one signaling message including information identifying the UE context.

3. A method for a core network node for a communication network, the method comprising:

obtaining a resume identifier configured to identify a user equipment ("UE") context associated with a communication device, the resume identifier identifying base station to which the communication device was previously connected; and sending, to another base station, the resume identifier to retrieve the UE context from the base station identified by the resume identifier.

4. The method according to claim 3, wherein the obtaining includes obtaining the resume identifier from the communication device or from the base station.

5. The method according to claim 3, further comprising:
determining that the communication device changed its network attachment; and
sending the resume identifier upon the determining.

6. A method for a communication device for a communication network, the method comprising:

sending, when the communication device leaves a first cell and camps on a second cell, to a core network node, information identifying a number of radio bearers to be resumed, information identifying the second cell and a resume identifier identifying a base station to which the communication device was previously connected, for the communication device, for use in resumption of a previously suspended communication connection between the communication device and the base station.

7. The method according to claim 6, wherein the sending includes sending the information identifying the second cell within a tracking area update ("TAU") message transmitted towards the core network apparatus.

* * * * *